(12) United States Patent  (10) Patent No.: US 7,511,745 B2
Aoyama  (45) Date of Patent: Mar. 31, 2009

(54) IMAGING APPARATUS, AND IMAGE DISPLAY METHOD AND PROGRAM FOR THE IMAGING APPARATUS

(75) Inventor: Tatsuya Aoyama, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 551 days.

(21) Appl. No.: 10/397,383

(22) Filed: Mar. 27, 2003

(65) Prior Publication Data

US 2003/0184667 A1 Oct. 2, 2003

(30) Foreign Application Priority Data

Mar. 27, 2002 (JP) ............................. 2002-089052

(51) Int. Cl.
H04N 5/262 (2006.01)
H04N 5/222 (2006.01)

(52) U.S. Cl. ................. 348/240.2; 348/240.99; 348/333.01; 348/333.12

(58) Field of Classification Search ............ 348/333.12, 348/240.2, 333.01–333.13, 207.99, 222.1, 348/236.1, 240.99, 345, 561; 396/374, 379
See application file for complete search history.

(56) References Cited

U.S. PATENT DOCUMENTS

| | | | | |
|---|---|---|---|---|
| 5,172,234 A * | 12/1992 | Arita et al. | ............... | 348/240.2 |
| 5,557,328 A * | 9/1996 | Ishihama et al. | ......... | 348/240.3 |
| 5,867,217 A * | 2/1999 | Okino et al. | ........... | 348/240.99 |
| 6,188,432 B1 * | 2/2001 | Ejima | .................... | 348/240.99 |
| 6,476,868 B1 * | 11/2002 | Kaji et al. | .............. | 348/333.12 |
| 6,522,360 B1 * | 2/2003 | Miyawaki et al. | ........... | 348/347 |
| 6,812,967 B1 * | 11/2004 | Niikawa et al. | ........ | 348/333.05 |
| 6,853,401 B2 * | 2/2005 | Fujii et al. | ............... | 348/223.1 |
| 6,888,567 B2 * | 5/2005 | Watanabe | ................ | 348/211.8 |
| 6,952,230 B2 * | 10/2005 | Ejima et al. | ............ | 348/333.05 |
| 7,187,412 B1 * | 3/2007 | Silverstein | ............. | 348/333.01 |
| 7,433,518 B2 * | 10/2008 | Shiratani | .................... | 382/190 |
| 2001/0012072 A1 * | 8/2001 | Ueno | .................... | 348/333.02 |
| 2001/0013897 A1 * | 8/2001 | Kowno et al. | ............... | 348/240 |

(Continued)

FOREIGN PATENT DOCUMENTS

JP 2001-61093 A 3/2001

OTHER PUBLICATIONS

Microsoft Press Computer Dictionary, 3rd Ed., Microsoft Corporation 1997, p. 361.*

Primary Examiner—David L Ometz
Assistant Examiner—Richard M Bemben
(74) Attorney, Agent, or Firm—Birch, Stewart, Kolasch & Birch LLP (57) ABSTRACT

Disclosed herein is an imaging method and apparatus that provide facility to verify focus condition of images obtained without missing the chance of snapping a shot. A series of image data sets are obtained by an imaging device through a consecutive imaging method or the like, and stored in a storage device. The plurality of image data sets is displayed sequentially on an LCD monitor, and a region of a predetermined range extracted. The image data set corresponding to the extracted region of the predetermined range is enlarged in an enlarging device to obtain an enlarged image data set. A display controller sequentially displays the enlarged image data sets on the LCD monitor. In this fashion, the defocused levels of the images, that is, whether or not the images are in focus, can be verified in an unhurried manner after the image data sets are obtained.

26 Claims, 7 Drawing Sheets

U.S. PATENT DOCUMENTS

2005/0219666 A1* 10/2005 Ejima et al. ................. 358/539
2005/0231601 A1   10/2005 Higuchi et al.
2005/0270638 A1* 12/2005 Soenksen .................... 359/368

* cited by examiner

IMAGING APPARATUS, AND IMAGE DISPLAY METHOD AND PROGRAM FOR THE IMAGING APPARATUS

BACKGROUND OF THE INVENTION

1. Field of the Invention

The present invention relates to an imaging apparatus such as a digital camera or the like in which an image data set of a subject is obtained by taking the image of the subject, which is stored in a storage device and then displayed on a display such as an LCD (liquid crystal display) monitor or the like, a display method for the imaging apparatus and a program for causing a computer to execute the display method.

2. Description of the Related Art

Many of the imaging apparatuses currently available, such as digital still cameras, digital video cameras and the like, have an LCD monitor capable of displaying an image that is to be taken or an image that has been taken. By displaying an image on an LCD monitor, the image angle, brightness and the like of the subject to be taken can be verified, or the qualities of the image which has already been taken can be verified.

While taking the image of a subject, it is necessary to display the image on the LCD monitor to verify that the subject is in focus. However, as the size of imaging apparatuses being produced becomes smaller, the size of the screen of the LCD monitor also becomes smaller. With such a small LCD monitor, it is difficult to discern whether or not the subject is in focus, and it is often discovered that the subject is out of focus, giving a blurred image when it is displayed later on a larger monitor.

While the number of pixels or the size for an image obtained by digital cameras has increased with the improvement of the functions, the size of the LCD monitor of digital cameras has been downsized, so that it has become further difficult to discern whether or not the subject is properly focused from the image displayed on the LCD monitor.

For this reason, an imaging apparatus capable of enlarging a portion of the image displayed on the LCD monitor and displaying the enlarged portion prior to obtaining the image has been proposed (see U.S. Laid-Open No. 20010012072). According to the aforementioned imaging apparatus, it becomes easier to verify whether or not the image is in focus by displaying the enlarged image on the LCD monitor.

However, there are cases in which a chance of snapping a shot is missed while enlarging and viewing the enlarged image on the LCD monitor for the purpose of verifying whether or not the subject is in correct focus.

SUMMARY OF THE INVENTION

In view of the foregoing, the object of the present invention is to provide facility to verify focus condition of images without missing a chance of snapping a shot.

The imaging apparatus according to the present invention comprises an imaging device for imaging a subject to obtain an image data set representing an image of the subject; a storage device for storing the image data set; a display for displaying the image represented by the image data set; a region extracting device for extracting a region of a predetermined range from each of a plurality of images represented by a plurality of image data sets obtained by a series of operations of the imaging device and stored in the storage device; an enlarging device for enlarging the regions of the predetermined range extracted from the plurality of images; and a display controller for displaying the regions on the display.

The referent of "a plurality of image data sets obtained by a series of operations of the imaging device" can include, for example, a plurality of image data sets obtained by a bracket imaging method or a consecutive imaging method. Further, "a plurality of image data sets obtained by a series of operations of the imaging device" can also refer to a plurality of image data sets arbitrarily selected by the user of the apparatus, or a plurality of image data sets obtained within a predetermined time period, assuming that the same type of images have been obtained in that time period.

Here, "bracket imaging method" refers to the consecutive imaging to obtain a plurality of images for a single subject by changing the parameters such as the focal position, the exposure, the chromaticity and/or contrast and the like that have an impact on image quality between a plurality of levels.

Further, "enlarging the region of the predetermined range" refers to the enlargement of the image of the region of the predetermined range to a size larger than that of the corresponding region in the state wherein the entire image is displayed on the display. Here, when the display is of a compact size, the image represented by the original image data set (the original image) is displayed on the small-sized display as a reduced image. In cases such as this, even if a predetermined region of the reduced image has been enlarged, there are cases in which the size of the enlarged image is still smaller than the size of the corresponding region in the original image. However, even if the size thereof is smaller than that of the original image, if the enlargement region of the predetermined range is enlarged so as to be displayed in a larger aspect than the reduced image displayed on the display, the enlarged region of the predetermined range can be more suitably used to verify whether or not the subject is in focus. Accordingly, the term "enlargement" as used in this specification refers not only to the enlargement whereby the size of an image is made larger than that of the original image, but also includes cases in which the overall size of the enlarged image is smaller than that of the original image, so long as the size of the enlarged image of the region of the predetermined range is larger than the size of the corresponding region when the image data set is displayed in its entirety on the display.

Note that when photographing a subject, it is often the case in which the subject is positioned in the central of the image. Therefore, the region of the predetermined range can be set in advance, for example, in the central area of the image.

This allows the user to examine an enlarged image on the display without specifying the enlargement region.

Further, according to the imaging apparatus of the present invention, the display controller can be designed for displaying on the display an image selected from among the plurality of images, and the region extracting device can be designed for receiving specification of a region within the image displayed on the display and extracting the region of the predetermined range corresponding to the specified region from each of the plurality of images including the displayed image.

This allows the user to extract the region of the predetermined range from each of a plurality of images by specifying the range only for the image displayed on the display, so that the burden of specifying the region of the predetermined range for each of the plurality of images can be removed.

Further, the imaging apparatus according to the present invention can further comprise an enlargement rate receiving device for receiving input of the enlargement rate for the region of the predetermined range to be displayed as an enlarged image, wherein the region extracting device changes the size of the predetermined range according to the inputted enlargement rate.

This allows the user to display on the display an image having a desired enlargement rate.

Further, the imaging apparatus according to the present invention can further comprise a predetermined range inputting device for receiving input for changing the size of the predetermined range and the enlarging device can also be designed for setting the enlargement rate for the region of the predetermined range according to the size of the predetermined range specified by the input.

This allows an image that has an enlargement rate in accordance with the size of the predetermined range to be displayed on the display.

Further, according to the imaging apparatus of the present invention, the display controller can be designed to split the screen of the display into a number of display areas to simultaneously display all of the enlarged regions of the predetermined range.

This allows a simultaneous verification of the defocused levels of all of the images obtained by a series of operations of the imaging device.

However, since the display area of the display is limited, if all of the plurality of images are displayed on the display simultaneously, the size of the display area per image becomes smaller. Therefore, the display controller can also be designed to sequentially display the plurality of the enlarged regions of the predetermined range on the display.

This allows each of the plurality of enlarged images to be displayed on the full size of the display area of the display, thereby verification of the focus condition and other qualities of each enlarged image can be facilitated.

Further, the imaging apparatus according to the present invention can further comprise a defocused level information obtaining device for obtaining information indicating a defocused level of each of the plurality of images.

This allows the readily verification of the defocused level of the plurality of images, that is, whether or not the images are in focus by examining the defocused level information.

Note that for the case in which the entirety of the plurality of regions of the predetermined range is displayed simultaneously on the split screen of the display, the order in which the images are arranged on the display can be set according to the defocused level. In this fashion, the defocused levels of a plurality of images, that is, whether or not the images are in focus can be readily verified.

Further, for cases in which the plurality of images is displayed sequentially on the display, the order in which the images are displayed can be set according to the defocused level. In this manner, the defocused levels of a plurality of images, that is, whether or not the images are in focus can be readily verified.

Still further, the imaging apparatus according to the present invention can further comprise an image selecting device for selecting a desired image from among the plurality of images, and a deleting device for deleting images other than the selected image from the storage device.

This allows unnecessary image data sets to be deleted from the storage device, thus adequate storage capacity for image data sets is ensured.

Note that a deletion confirming device can further be provided for prompting the user to confirm that the deletion be effected, and the deleting device can be designed for deleting images other than the selected image after the deletion is confirmed to be effected.

In this fashion, the inadvertent deletion of necessary data from the storage device can be prevented.

The image display method according to the present invention is intended to be implemented by an imaging apparatus having an imaging device for imaging a subject to obtain an image data set representing an image of the subject; a storage device for storing the image data set; and a display for displaying the image represented by the image data set, comprising the steps of extracting a region of a predetermined range from each of a plurality of images represented by a plurality of image data sets obtained by a series of operations of the imaging device; enlarging the regions of the predetermined range extracted from the plurality of images; and displaying the enlarged regions on the display.

Note that in the image display method of the present invention, the region of the predetermined range can be a region set on the image in advance.

Further, the image display method of the present invention can further comprise the steps of selecting an image from among the plurality of images and displaying the selected image on the display; receiving specification of the region in the image displayed on the display; and extracting from all of the images contained in the plurality of images including the displayed image the regions corresponding to the specified region as the region of the predetermined range.

Further, the image display method according to the present invention can further comprise a step of receiving input of the enlargement rate for displaying the images to be enlarged, wherein the size of the predetermined range is changed according to the inputted enlargement rate.

Further, the image display method according to the present invention can further comprise steps of receiving input for changing the size of the predetermined range and setting the enlargement rate for the region of the predetermined range according to the size of the predetermined range specified by the input.

Further, according to the image display method of the present invention, the screen of the display can be split into a number of display areas to simultaneously display all of the enlarged regions of the predetermined range.

Further, according to the image display method of the present invention, the plurality of regions of the predetermined range can also be displayed sequentially on the display.

Further, the image display method according to the present invention can further comprise a step of obtaining defocused level information indicating the defocused level of each image of the plurality of images.

Note that for cases in which all of the plurality of regions of the predetermined range is displayed simultaneously on a split screen of the display, the order in which the images are arranged on the display can be set according to the defocused level.

Further, for the case in which the plurality of images is displayed sequentially on the display, the order in which the images are displayed can be set according to the defocused level.

Still further, the image display method according to the present invention can further comprise steps of receiving the selection of a desired image from among the plurality of images, and deleting images other than the selected image from the storage device.

In that case, a step of prompting the user to confirm that the deletion be effected can be further implemented to delete images other than the selected image after the deletion is confirmed to be effected.

Note that the image display method according to the present invention can be provided as a program for causing a computer to execute the display method.

According to the present invention, a region of a predetermined range is extracted from each of a plurality of images represented by a plurality of image data sets obtained by a series of operations of the imaging device and stored in the storage device, and the region of the predetermined range extracted from each of the plurality of images is enlarged and displayed on a display. This allows the user to tentatively photograph a series of images and display them on the display when the user has the time so that the defocused levels, that is, whether or not the images are in focus can be verified carefully by taking time without missing a chance of snapping a shot due to focus confirmation at photographing.

DESCRIPTION OF THE PREFERRED EMBODIMENTS

Figure 1:
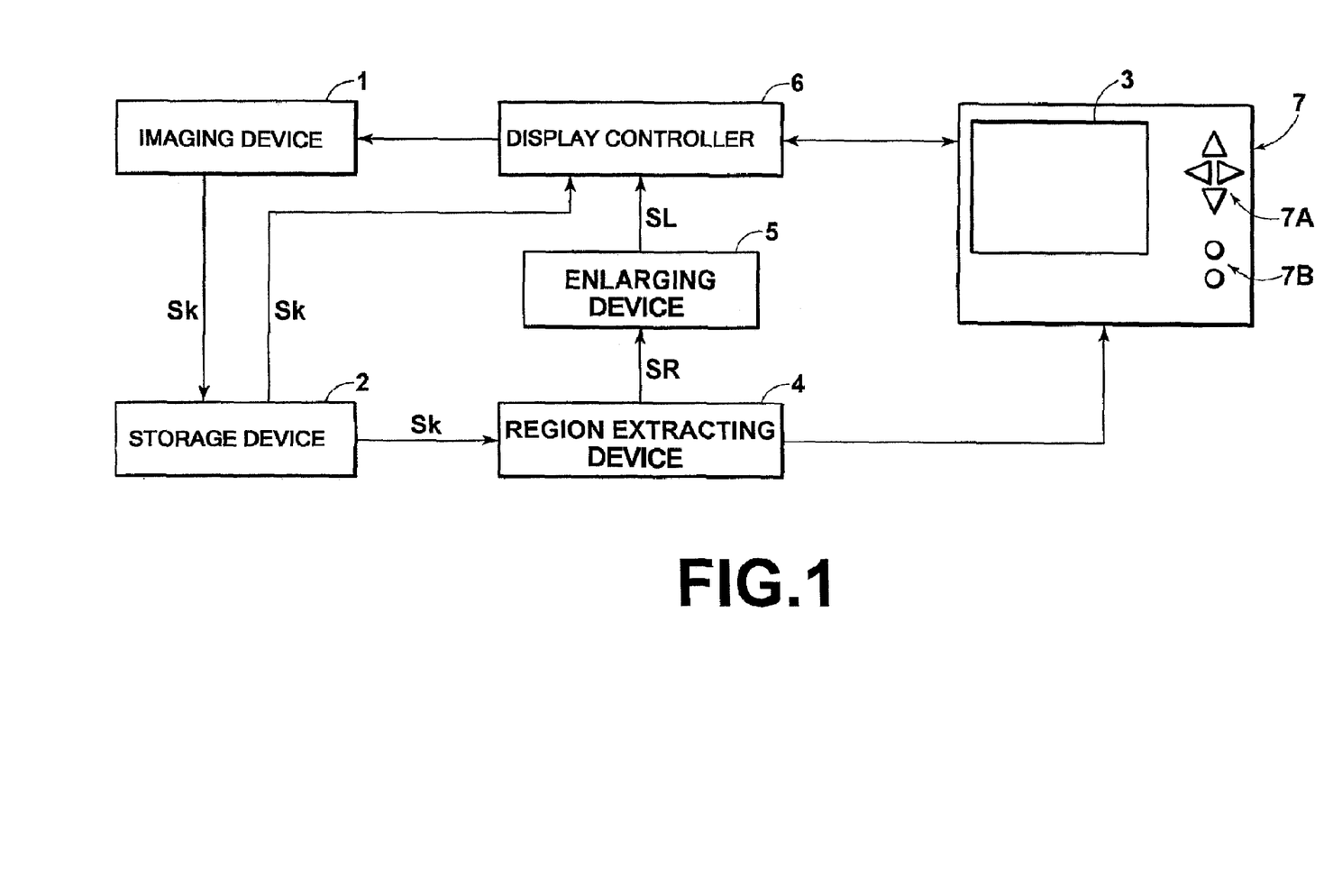
FIG. 1 is a schematic block diagram illustrating a configuration of the imaging apparatus according to a first embodiment of the present invention.

Hereinafter preferred embodiments of the present invention will be explained with reference to the attached drawings. FIG. 1 is a schematic block diagram illustrating a configuration of the imaging apparatus according to a first embodiment of the present invention. As shown in FIG. 1, the imaging apparatus according to the first embodiment comprises: an imaging device 1 for imaging a subject to obtain an image data set S0 representing the image of the subject; a storage device 2 comprising a memory card or the like for storing the image data set S0 obtained by the imaging device 1; an LCD (liquid crystal display) monitor 3 for displaying the image; a region extracting device 4 for extracting from the image data set S0 stored in the storage device 2 a region of a predetermined range, which is further described below; an enlarging device 5 for enlarging the extracted region; a display controller 6 for controlling the display of the image on the LCD monitor 3; and a user interface including an input section 7 having a numeric pad 7A and a variety of other input buttons 7B.

The imaging device 1 has a CCD, a focusing optical system, a shutter, a zooming function, an AE mechanism, an AF mechanism, and various other components required for obtaining images.

As is generally known in the art, an imaging apparatus (e.g., digital camera) such as the one illustrated in FIG. 1 may include a microprocessor to perform various control functions of the imaging apparatus, such as those functions represented by the region extracting device 4, enlarging device 5, and display controller 6 (which will be described in more detail below).

The region extracting device 4 is designed for extracting a predetermined region from each image of the plurality of images represented by a plurality of image data sets Sk (k=1–n) obtained by a series of operations of the imaging device 1.

Here, the referent of "a plurality of image data sets Sk obtained by a series of operations of the imaging device 1" can be, for example, a plurality of image data sets obtained by a bracket imaging method or a consecutive imaging method. Further, "a plurality of image data sets Sk obtained by a series of operations of the imaging device 1" can also refer to a plurality of image data sets arbitrarily selected by the user, or a plurality of image data sets obtained within a predetermined time period, assuming that the same type of images have been obtained in that time period.

In this embodiment, a plurality of image data sets obtained within a predetermined time period is used as "a plurality of image data sets Sk obtained by a series of operations of the imaging device 1", assuming that the user intentionally carries out multiple imagings of a single scene with the object of not missing a chance of snapping a shot.

Figure 2A:
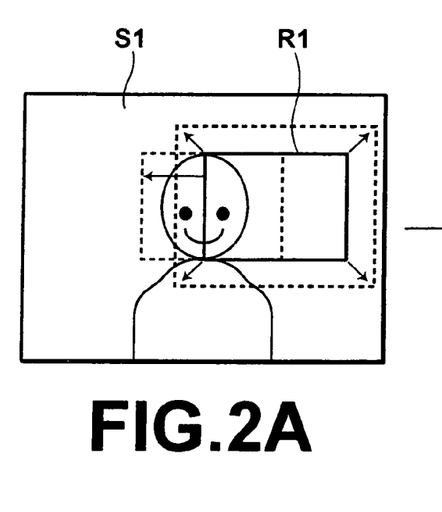
FIG. 2A is a drawing illustrating the state wherein one image data set from among a plurality of image data sets is displayed on an LCD monitor.

The plurality of image data sets Sk is read out sequentially from the storage device 2 and displayed sequentially on the LCD monitor 3 by the instruction of the user through the input section 7 of the user interface. FIG. 2A is a drawing illustrating the state wherein one image data set (e.g., an image data set S1) from among a plurality of image data sets Sk is displayed on the LCD monitor 3. As shown in FIG. 2A, an image data set S1 (e.g. an image data set obtained first) from among the plurality of image data sets Sk is read out from the storage device 2 and displayed on the LCD monitor 3, and a rectangular region R1 of a predetermined range is indicated on the displayed image in accordance with the instruction given by the user through the input section 7. The user can move the region R1 to a desired position on the displayed image by operating the keys of the numeric pad 7A of the input section 7. Further, the size of the region R1 can be variously changed by inputs specified from the input section 7. After the region R1 is moved to a desired position on the displayed image and the instruction for extracting the region R1 is given by the user through the input section 7, the region extracting device 4 extracts from the displayed image the region corresponding to the region R1 to obtain a region image data set SR representing the extracted region.

Figure 2B:
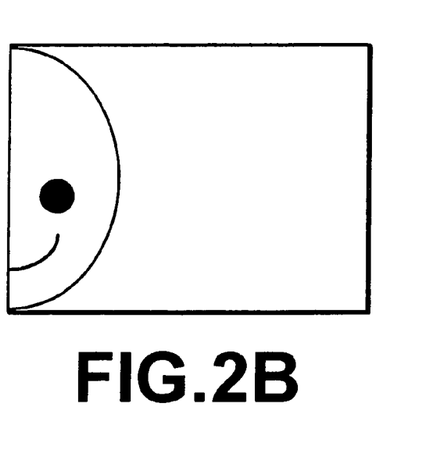
FIG. 2B is a drawing illustrating the state wherein an enlarged image data set is displayed on an LCD monitor.

As shown in FIG. 2B, the obtained region image data set SR is enlarged by the enlarging device 5 to obtain an enlarged image data set SL, which is then displayed on the LCD monitor 3 through the display controller 6. At that time, the enlargement rate is set so that the region R1 is displayed on the LCD monitor 3 at approximately the same size as the display area of the LCD monitor 3.

Note that the enlargement rate can be set in advance through the input section 7 to display the region R1 on the LCD monitor 3 at the size corresponding to the predefined enlargement rate. Here, the enlargement rate can be inputted at a desired value by the user; however, it is also possible to provide a number of enlargement rate options and prompt the user to select a desired option.

Figure 3A:
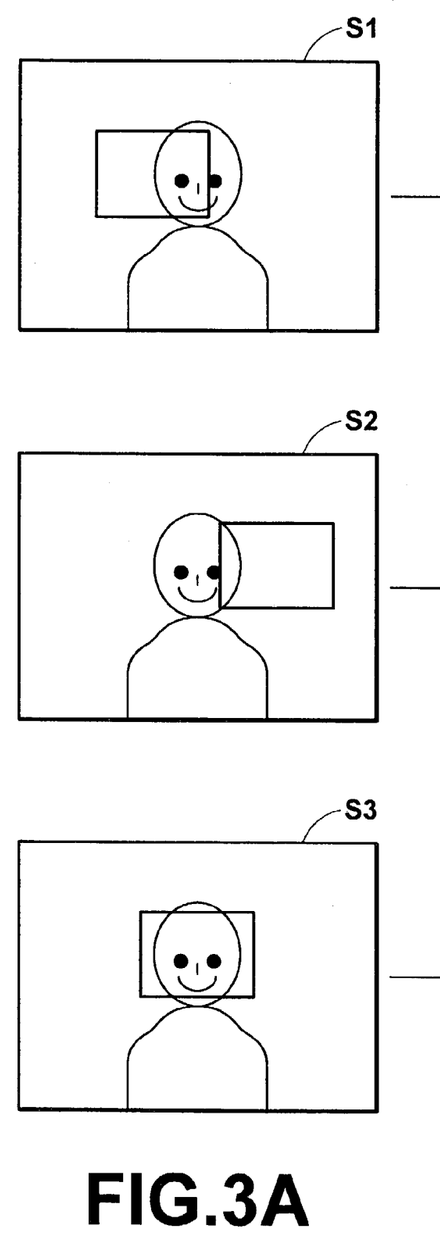
FIG. 3A is a drawing illustrating the state wherein a plurality of image data sets is displayed on an LCD monitor.

Note that the region extracting device 4 can sequentially display, as shown in FIG. 3A, a plurality of image data sets Sk (here, three image data sets S1-S3) on the LCD monitor 3.

Then, by specifying the region R1 of each of the respective image data sets S1-S3, the corresponding region of each of the image data sets S1-S3 can be extracted to obtain the respective region image data sets SR1-SR3, which can be displayed on the LCD monitor 3 through the display controller 6.

Figure 3B:
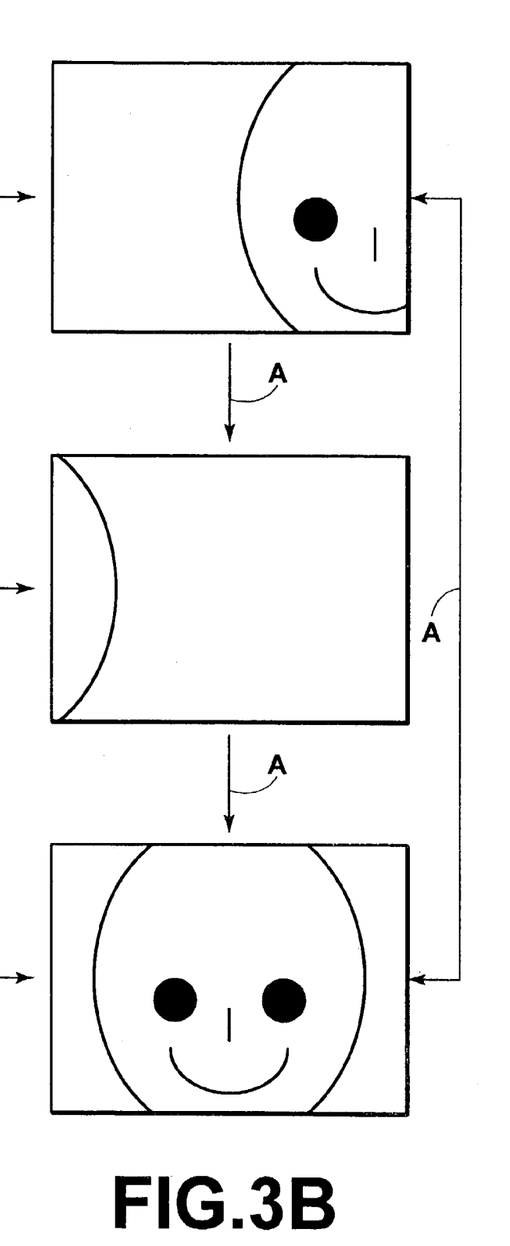
FIG. 3B is a drawing illustrating the state wherein enlarged image data sets are displayed on an LCD monitor.

Here, the mode for displaying a plurality of enlarged image data sets SL can be that of displaying an enlarged image each time the region from each image data set Sk has been extracted, or that of displaying all of the enlarged images sequentially at regular intervals as indicated by the arrow A in FIG. 3B after the regions from all of the image data sets Sk are extracted. Further, the display of the enlarged images can also be switched in accordance with inputs from the input section 7 by the user.

Figure 4:
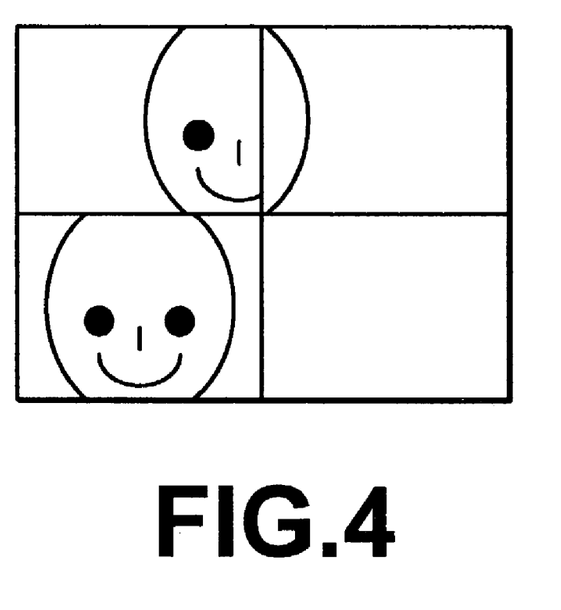
FIG. 4 is a drawing illustrating the state wherein a plurality of image data sets is displayed on a split screen of an LCD monitor.

Note that, as shown in FIG. 4, the display screen of the LCD monitor 3 can be split into a plurality of display areas to display a plurality of enlarged images simultaneously.

Further, as it is troublesome to sequentially display all of the image data sets Sk on the LCD monitor and extract the regions from respective images, the region R1 can be set for the image data set displayed first (e.g., S1) to obtain the region image data set SR, and the regions corresponding to the region R1 set for the first image data set can be extracted from respective image data sets to obtain the region image data sets SR thereof. In this fashion, the burden on the user for the region setting can be reduced.

Figure 5:
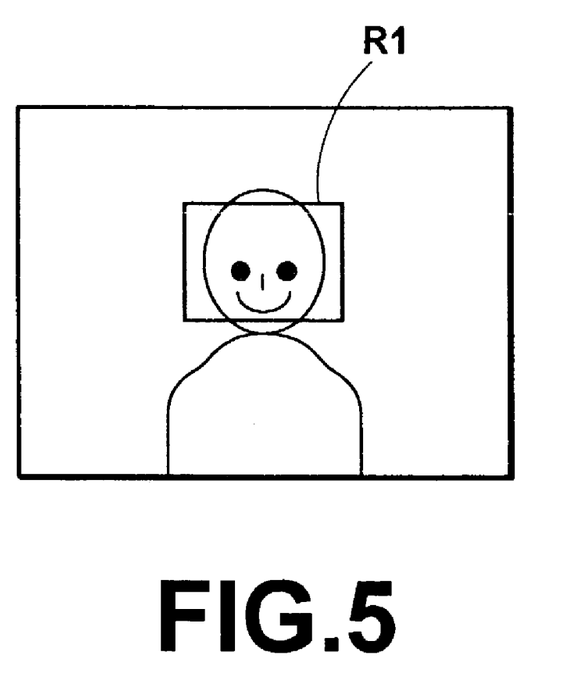
FIG. 5 is a drawing illustrating the state wherein a region has been set at a fixed position in the vicinity of the center of the LCD monitor.

Still further, because it is often the case that the user will snap a shot with the subject positioned in the central region of the image, the region R1 can be fixed in the central region of the image, as shown in FIG. 5. In this fashion, the user is released from the further region setting whatsoever, so that the burden on the user is reduced.

The display controller 6 performs control for displaying the image being picked up by the imaging 1 as a moving image and the image obtained by the operation of the shutter by the user as a still image on the LCD monitor 3. Further, the display controller 6 also performs control for displaying on the LCD monitor 3 the plurality of image data sets Sk that has been obtained by a series of operations of the imaging and stored in the storage device 2, as well as for displaying on the LCD monitor 3 the enlarged image of the predetermined region of each of a plurality of images represented by a series of image data sets Sk through the instruction from the input section 7.

The input section 7 of the user interface is provided for giving instructions to display images, select an image to be displayed, specify the region on the image, modify the size of the region, specify the enlargement rate, specify the display mode of the enlarged images (simultaneous or sequential), delete image data sets (described below), and the like.

Figure 6:
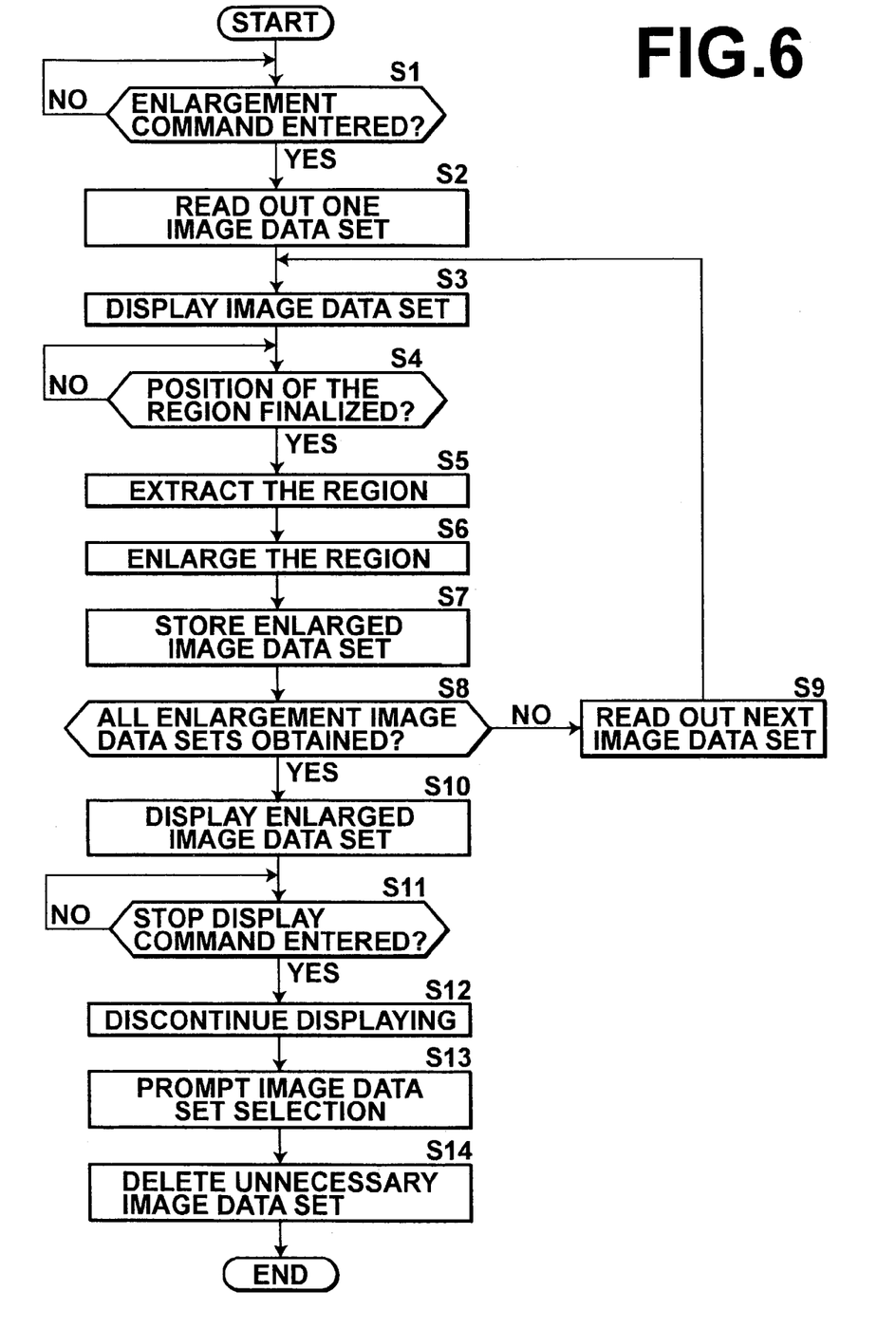
FIG. 6 is a flowchart illustrating a process of the first embodiment.

Next, the operation of the first embodiment will be described. FIG. 6 is a flowchart illustrating operation of the first embodiment. Here, an explanation is provided for a case in which the region will be specified on all the image data sets Sk and the enlarged image data set SL for each region of image data set SR extracted from each image data set Sk will be displayed sequentially on the LCD monitor 3 at regular intervals. It is also assumed that the series of image data sets Sk have already been obtained and stored in the storage device 2.

First, the enlargement command is entered from the input section 7 by the user (step S1), whereupon one image data set from among a plurality of image data sets Sk (e.g., an image data set obtained first) is read out from the storage device 2 (step S2), and displayed on the LCD monitor 3 (step S3). In this state, the image and the region R1 are displayed on the LCD monitor 3 as shown in FIG. 2a, and the user specifies the position of the region R1 through the input section 7. Then, when an input indicating that the position of the region R1 has been finalized is entered from the input section 7 (step S4:affirmative), the region extracting device 4 extracts from the image represented by the image data set Sk the region corresponding to the region R1 to obtain a region image data set SR (step S5). Step S4 remains in negative until the position of the region R1 is finalized.

The region image data set SR is fed to the enlarging device 5 and the region R1 is enlarged to the size of the display area of the LCD monitor 3, thereby an enlarged image data set SL is obtained (step S6). The enlarged image data set SL is temporarily stored in the storage device 2 (step S7). Then, a determination is made as to whether or not enlargement image data set has been obtained for all of the image data sets Sk (step S8). If step 8 is negative, the next image data set Sk is read out from the storage device 2 (step S9), and the process flow returns to step S3 and the processing from step S3 to step 8 is repeated until step 8 becomes affirmative.

When step S8 becomes affirmative, the enlarged image data sets SL for all of the image data sets Sk are displayed sequentially on the LCD monitor 3 at regular intervals (step S10). This allows the user to review the enlarged partial images of the image data sets Sk on the LCD monitor 3, so that the user can readily understand which of the images is the most sharply focused image. The display of the enlarged partial images continues until the user enters the stop display command from the input section 7; and when the user enters the stop display command, step S11 becomes affirmative, and the display is discontinued (step S12).

Thereafter, the most desirable image data set or the most sharply focused image is selected by the user through the input section 7 (step S13), which causes the image data sets other than the selected image to be deleted from the storage device 2 and the process flow is closed (step S14).

Thus, according to this embodiment, a region of a predetermined range is extracted from each image of a plurality of images represented by a plurality of image data sets Sk obtained by a series of operations of the imaging device 1 and stored in the storage device 2, and the plurality of the extracted regions of the predetermined range are enlarged and displayed on the LCD display 3. This allows the user to tentatively photograph a series of images and display them on the LCD display 3 when the user has the time so that the defocused levels, that is, whether or not the images are in focus can be verified carefully by taking time without missing a chance of snapping a shot due to focus confirmation at photographing.

Further, the image data sets other than the selected data are deleted from the storage device 2 so that adequate storage capacity for image data sets in the storage device 2 is ensured.

Figure 7:
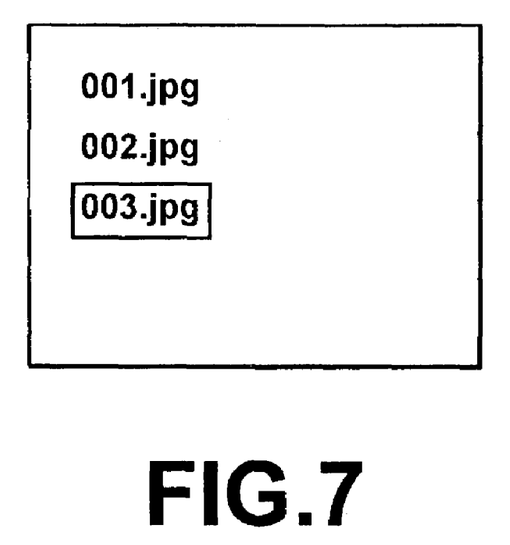
FIG. 7 is a drawing illustrating the state wherein the file names of a plurality of image data sets are displayed on an LCD monitor.
Figure 8:
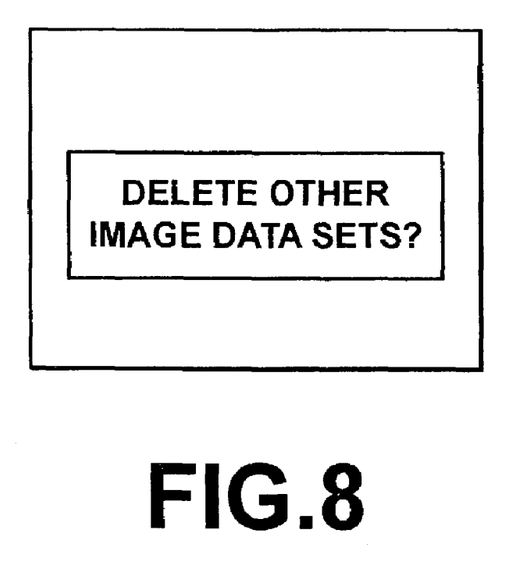
FIG. 8 is a drawing illustrating the state wherein a confirmation message is displayed on an LCD monitor.

When selecting the most sharply focused image, the file names of the image data sets Sk are displayed on the LCD monitor 3 as shown in FIG. 7 as an example, whereupon the user selects the file name of the desired image data set, using the keys of the numeric pad 7A, (selection is made by enclosing the file name with a square outline, or by highlighting the file name in an inverted image), and presses the button 7B, thereby the specified image is selected. It is preferable that a confirmation message, e.g. "Delete other image data sets?" or the like be displayed, as shown in FIG. 8. This allows the user to have an opportunity to confirm that the deletion be effected before it is actually effected so that the inadvertent deletion of necessary image data set from the storage device 2 can be prevented.

Figure 9:
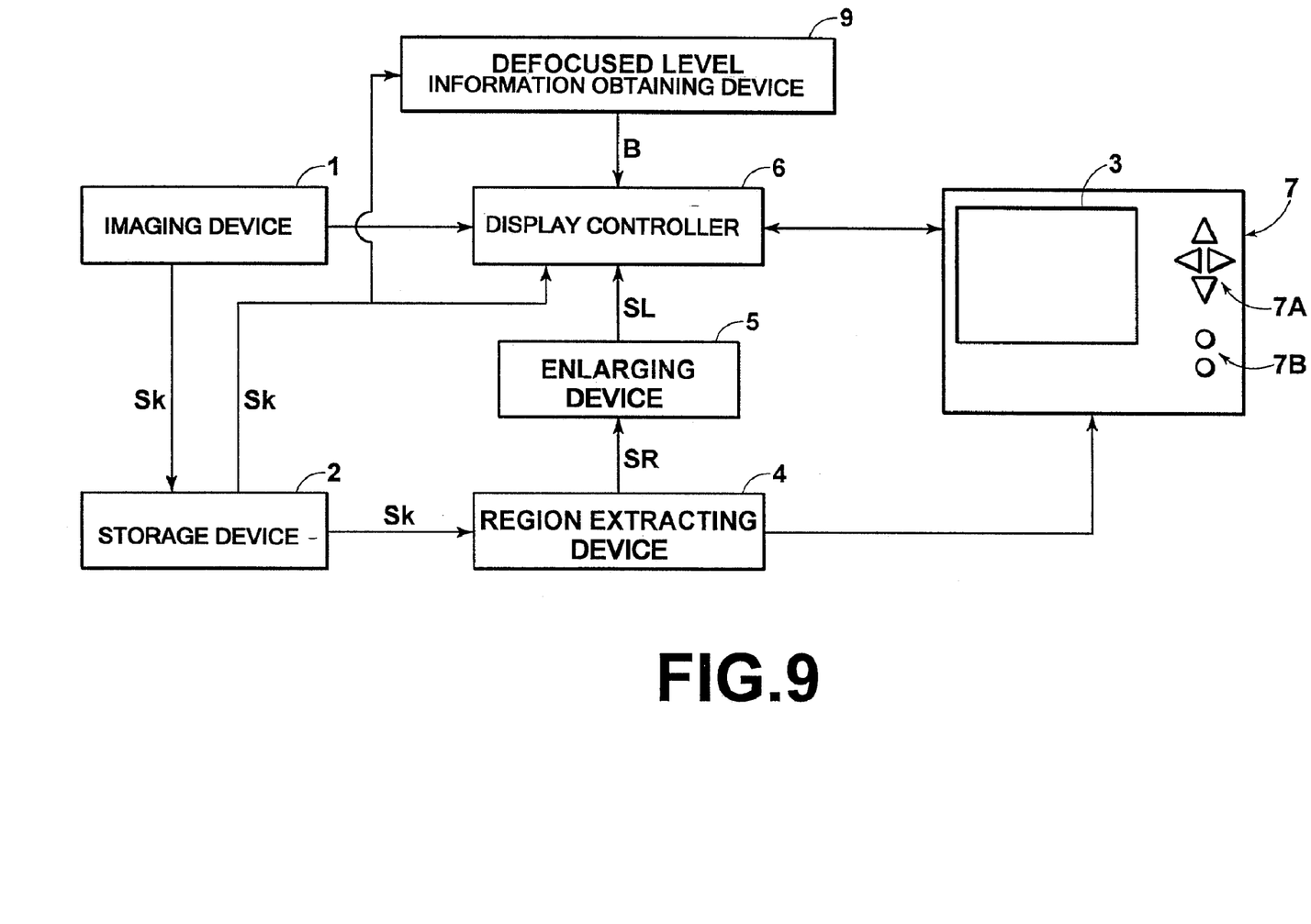
FIG. 9 is a schematic block diagram illustrating a configuration of the imaging apparatus according to a second embodiment of the present invention.

Next, a second embodiment of the present invention will be explained. FIG. 9 is a schematic block diagram illustrating a configuration of the imaging apparatus according to the second embodiment of the present invention. In FIG. 9, the component identical to that used in the first embodiment is given the same reference number and will not be elaborated upon further here. The second embodiment differs from the first embodiment in that the second embodiment further comprises a defocused level information obtaining device 9 for obtaining the defocused levels of a plurality of image data sets Sk.

The defocused level information obtaining device 9 subjects a plurality of image data sets Sk to a frequency analysis process to obtain a defocused level information B representing the defocused level of each image represented by the image data set Sk, and inputs the obtained defocused level information B to the display controller 6. More specifically, the frequency response characteristics of each image data set Sk is obtained by the frequency analysis process, wherein the magnitude of the response of a frequency band recognized as the edge contained in the image (hereinafter referred to as the "edge frequency band") is recognized as the defocused level of the image represented by the image data set Sk. Accordingly, the larger the response of the edge frequency band, the smaller the defocused level, whereby it can be determined that the image is more sharply focused. Therefore, according to the second embodiment, the defocused level information B corresponds to the magnitude of the frequency response of the edge frequency band for each image data set of the plurality of image data sets Sk.

The display controller 6 sets the display order in which the enlarged image data sets SL are to be displayed on the LCD monitor 3 based on the defocused level information B and sequentially displays the enlarged image data sets SL on the LCD monitor 3 in the set order by switching the image data sets at a regular time interval. Note that the display order can be set so that the display starts from the image having the highest defocused level, that is, the most defocused image, or the image having the lowest defocused level, that is, the most sharply focused image.

In the second embodiment, the display order of the enlarged image data sets SL has been set based on the defocused levels thereof in the aforementioned manner so that the defocused level, that is, whether or not each of the plurality of image data sets Sk is in-focus or not can be readily verified.

In displaying a plurality of enlarged image data sets SL simultaneously on a split screen as shown in FIG. 4, the display order can also be set based on the defocused level information B, whereby the defocused level, that is, whether or not each of the plurality of image data sets Sk is in focus or not can be readily verified.

What is claimed is:

1. An imaging apparatus comprising:
   an imaging device for capturing a plurality of still images of a subject to obtain a plurality of image data sets representing the plurality of captured images, respectively, of said subject;
   a memory card for storing said image data sets;
   a display for displaying the captured images represented by the image data sets;
   a user interface configured to receive input from a user designating a region on the display while a particular one of the captured images is being displayed on the display, the designated region being moved to a desired position of the displayed captured image by the user via the user interface, such that the designated region defines a predetermined range and position for each of the remaining captured images to be extracted and enlarged;
   a region extracting device operatively connected to the memory card for processing the image data sets in the memory card order to extract the designated region from each of the plurality of captured images represented by the plurality of image data sets stored in the memory card;
   an enlarging device operatively connected to the region extracting device for enlarging the designated regions extracted from said plurality of captured images according to a predetermined enlargement rate; and
   a display controller operatively connected to the enlarging device for displaying said enlarged regions of the plurality of captured images on the display.

2. An imaging apparatus as defined in claim 1, wherein the user interface is configured to
   receive input from the user defining the predetermined enlargement rate, wherein the region extracting device changes the size of the extracted regions of the plurality of captured images according to said inputted enlargement rate.

3. An imaging apparatus as defined in claim 1, wherein the user interface is configured to
   receive input for changing the size of the designated region, wherein the enlarging device sets the enlargement rate for the designated region according to the size of the predetermined range specified by the input.

4. An imaging apparatus as defined in claim 1, wherein
   the display is controlled so that the screen of the display is split into a number of display areas to simultaneously display the plurality of enlarged regions of the plurality of captured images.

5. An imaging apparatus as defined in claim 1, wherein
   the display controller sequentially displays the plurality of enlarged regions on the display.

6. An imaging apparatus as defined in claim 1, further comprising
   a defocused level information obtaining device operatively connected to the memory card for obtaining information indicating the defocused level of each of the plurality of captured images.

7. An imaging apparatus as defined in claim 4, wherein the one or more processors are further configured to
   obtain information indicating the defocused level of each of the plurality of captured images.

8. An imaging apparatus as defined in claim 7, wherein
   the display controller sets the order in which the plurality of enlarged regions is arranged on the split screen of the display according to the defocused level.

9. An imaging apparatus as defined in claim 5, further comprising
   a defocused level information obtaining device operatively connected to the memory card for obtaining information indicating the defocused level of each of the plurality of captured images.

10. An imaging apparatus as defined in claim 9, wherein
    the display controller sets the order in which the plurality of enlarged regions is displayed on the display according to the defocused level.

11. An imaging apparatus as defined in claim 1, wherein
    the user interface receives an input selecting a desired captured image from among the plurality of captured images, and
    the imaging apparatus further comprises a deleting device operatively connected to the memory card for deleting captured images other than said selected captured image to be deleted from the memory card.

12. An imaging apparatus as defined in claim 11, further comprising
a deletion confirming device operatively connected to the display for prompting the user of the apparatus to confirm that a deletion be effected, wherein the deleting device deletes captured images other than the selected captured image after the deletion is confirmed to be effected.

13. An image display method for use with an imaging apparatus having an imaging device for capturing a plurality of still images of a subject to obtain a plurality of image data sets representing the plurality of captured images, respectively, of said subject, a memory card for storing said image data sets, and a display for displaying the images represented by the image data sets, comprising the steps of:
receiving input from a user designating a region on the display while a particular one of the captured images is being displayed on the display, the designated region being moved to a desired position of the displayed captured image by the user via a user interface, such that the designated region defines a predetermined range and position for each of the remaining captured images to be extracted and enlarged;
processing the image data sets in the memory card in order to extract the designated region from each of the plurality of captured images represented by a the plurality of image data sets,
enlarging the designated regions extracted from said plurality of captured images according to a predetermined enlargement rate, and
displaying said enlarged regions of the plurality of captured images on the display.

14. An image display method as defined in claim 13, further comprising
receiving input from the user of the enlargement rate for the designated region to be displayed as an enlarged image, wherein
the size of the extracted regions of the plurality of captured images is changed according to said inputted enlargement rate.

15. An image display method as defined in claim 13, further comprising
a step of receiving input from the user for changing the size of the designated region, wherein
the enlargement rate for the designated region is set according to the size of the predetermined range specified by the input.

16. An image display method as defined in claim 13, wherein
the screen of the display is split into a number of display areas to simultaneously display all of the enlarged regions of the plurality of captured images.

17. An image display method as defined in claim 13, wherein
the plurality of enlarged regions is displayed sequentially on the display.

18. An image display method as defined in claim 13, further comprising
obtaining defocused level information indicating the defocused level of each of the plurality of captured images.

19. An image display method as defined in claim 16, further comprising
obtaining defocused level information indicating the defocused level of each of the plurality of captured images.

20. An image display method as defined in claim 19, wherein
the order in which the plurality of captured images is arranged on the display means is set according to the defocused level.

21. An image display method as defined in claim 17, further comprising
a step of obtaining defocused level information indicating the defocused level of each captured image of the plurality of captured images.

22. An image display method as defined in claim 21, wherein
the order in which the plurality of enlarged regions is displayed on the display is set according to the defocused level.

23. An image display method as defined in claim 13, further comprising:
receiving an instruction for selecting a desired captured image from among the plurality of captured images, and
deleting captured images other than said selected captured image from the storage device.

24. An image display method as defined in claim 23, further comprising the steps of:
prompting the user of the apparatus to confirm that a deletion be effected, and
deleting captured images other than the selected captured image after the deletion is confirmed to be effected.

25. An imaging apparatus as defined in claim 1, further comprising:
means for processing the image data sets to be suitable for display.

26. An imaging display method as defined in claim 13, further comprising:
processing the image data sets to be suitable for display.

* * * * *